United States Patent [19]
Valyi

[11] Patent Number: 5,398,828
[45] Date of Patent: Mar. 21, 1995

[54] BLOW MOLDED PLASTIC CONTAINERS INCLUDING INTERNAL SUPPORT AND HANDGRIP

[75] Inventor: Emery I. Valyi, Katonah, N.Y.

[73] Assignee: PepsiCo Inc., Purchase, N.Y.

[21] Appl. No.: 77,271

[22] Filed: Jun. 17, 1993

Related U.S. Application Data

[63] Continuation-in-part of Ser. No. 55,663, Apr. 29, 1993.

[51] Int. Cl.⁶ .......................... B65D 1/04; B65D 23/10
[52] U.S. Cl. .................. 215/100 A; 215/1 C;
   215/6; 220/555; 220/771; 220/772
[58] Field of Search .................. 25/16, 6, 100 A;
   220/23.8, 555, 525, 775, 771, 772

[56] References Cited

U.S. PATENT DOCUMENTS

| | | | |
|---|---|---|---|
| 2,753,990 | 9/1956 | Chalfin et al. | 215/6 X |
| 3,076,573 | 2/1963 | Thomas | 215/6 |
| 3,232,495 | 2/1966 | Schneider | 215/100 A X |
| 4,065,536 | 12/1977 | Lucas | 215/6 X |
| 4,277,000 | 7/1981 | Jaarsma | 215/6 X |
| 4,279,349 | 7/1981 | Aigner | 215/6 |
| 4,607,756 | 8/1986 | Courtman | 215/6 |
| 5,135,823 | 8/1992 | Eales | 215/6 X |
| 5,154,917 | 10/1992 | Ibrahim et al. | 215/6 X |
| 5,215,203 | 6/1993 | Malcolm | 215/100 A |
| 5,232,108 | 8/1993 | Nakamura | 215/6 |

FOREIGN PATENT DOCUMENTS

| | | | |
|---|---|---|---|
| 433014 | 4/1948 | Italy | 215/6 |
| 940326 | 10/1963 | United Kingdom | 215/6 |
| 9005674 | 5/1990 | WIPO | 215/1 C |

*Primary Examiner*—Sue A. Weaver
*Attorney, Agent, or Firm*—Bachman & LaPointe

[57] ABSTRACT

A blow molded plastic container including at least one internal supporting member integral with the inside wall face of the body portion to support same. In one embodiment, the body portion defines lobes connected together by depressions which define a handgrip, wherein the depressions are supported by the internal supporting member. In another embodiment, an axially, inwardly directed part is supported by the supporting member.

9 Claims, 5 Drawing Sheets

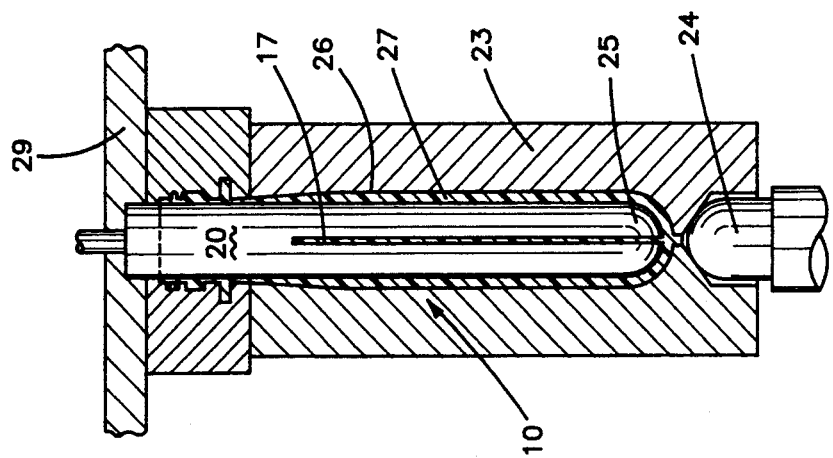
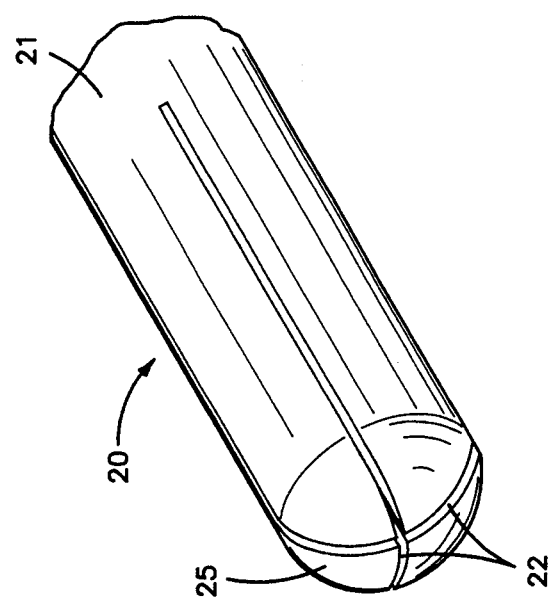
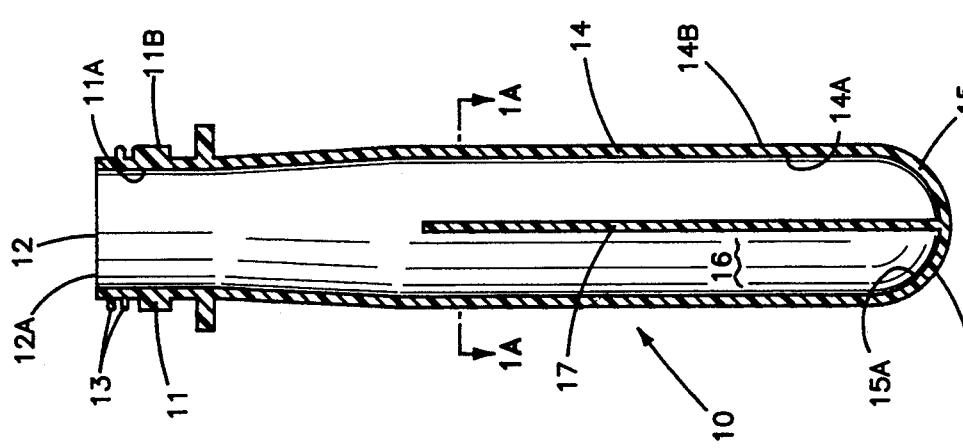

BLOW MOLDED PLASTIC CONTAINERS INCLUDING INTERNAL SUPPORT AND HANDGRIP

CROSS REFERENCE TO RELATED APPLICATION

This application is a continuation-in-part of U.S. patent application Ser. No. 08/055,663, filed Apr. 29, 1993, entitled PLASTIC PREFORM AND BLOW MOLDED PLASTIC CONTAINERS.

BACKGROUND OF THE INVENTION

The present invention relates to plastic containers especially for retention of fluids, as for carbonated beverages or the like. These containers may be prepared from a preform which may be injection or extrusion molded, followed by blow molding the preform into a suitably shaped container using a blow mold having the desired shape. A typical thermoplastic materials are polyethylene terephthalate or PET, polyolefins, etc., although others can be used.

The container configuration generally includes a neck portion with a cap retaining means, a shoulder portion depending therefrom, a side wall or main body portion depending from the shoulder portion and a bottom portion joined to the side wall and depending therefrom. In many of these containers the bottom portion desirably has a champagne bottle bottom configuration with an axially, inwardly directed generally conical part.

The bottom portion of these containers represent a weak part of the container and it is desirable to strengthen the bottom structure.

In addition, the public prefers large size containers especially for the convenience and economy they represent, as, for example, the two liter containers widely used for carbonated beverages. Indeed, even larger containers would be desirable. However, these containers are awkward to handle, especially for small children. In addition, the walls of these containers tend to bulge, making them even more awkward to handle.

Accordingly, it is a principal object of the present invention to provide a blow molded plastic container having an improved configuration.

It is a still further object of the present invention to provide a container as aforesaid with a strengthened bottom configuration, especially with a strengthened axially, inwardly directed bottom portion thereof.

It is a still further object of the present invention to provide an improved blow molded plastic container as aforesaid which is easy to handle even in large sizes and includes at least one readily formed and strengthened handgrip portion.

It is a still further object of the present invention to provide an improved blow molded plastic container with strengthened wall or body portions.

Further objects and advantages of the present invention will appear hereinbelow.

SUMMARY OF THE INVENTION

In accordance with the present invention, the foregoing objects and advantages may be readily obtained.

The present invention provides an improved blow molded plastic container. The blow molded plastic container comprises: a neck portion defining an opening, a bottom portion, and a body portion interconnecting said neck and bottom portions; wherein said neck, body and bottom portions define a hollow space closed at the bottom portion and open at the neck portion; said neck, body and bottom portions having an inside wall face and an outside wall face; and at least one supporting member in the hollow space extending completely across the hollow space and integral with the inside wall face of the body portion at two spaced locations thereof to support said inside wall face.

A preferred embodiment of the present invention provides that the body portion outside wall face defines regions that comprise at least two adjoining lobes connected together by depressions, wherein said supporting member is integral with the body portion inside wall face adjacent said depressions and supporting same. The lobes and depressions desirably form a handgrip. In one embodiment, the supporting member is adjacent and supports two of said depressions, and in another embodiment there are provided four of said adjoining lobes and four of said depressions with two of said supporting members, wherein the supporting members comprise internal supporting walls extending completely across the hollow space with each supporting wall interconnecting two of said depressions. In one embodiment the lobes are of approximately the same size and the supporting wall approximately crosses the center of the hollow space. In another embodiment the lobes are of unequal size and the supporting wall crosses the hollow space spaced from the center thereof. The internal supporting wall extends from the bottom portion to the body portion and is integral therewith and terminates in the body portion, wherein the lobes and depressions may be present only in the body portion.

In an additional embodiment of the present invention, the bottom portion includes an axially, inwardly directed part having an inside wall face thereof, wherein said supporting member is integral with at least a part of the body portion inside wall face and is also integral with the inwardly directed part inside wall face, to support said integral inside wall faces. A plurality of said supporting walls may be provided, and the supporting walls may terminate in the body portion.

In addition to the foregoing, the present invention provides a plastic preform for forming blow molded containers. The preform comprises: a neck portion defining an opening, a body portion depending therefrom, and an integral bottom portion depending from the body portion; wherein said body portion defines a hollow space closed at the bottom portion and open at the neck portion; and at least one internal wall extending completely across said hollow space from the bottom portion to the body portion and terminating in the body portion.

The container of the present invention provides numerous advantages. Firstly, a blow molded plastic container is provided with a supporting member inside the container providing support therefor. Supported handgrips may readily be obtained, and a bottom portion may be provided with internal supporting members providing support for an axially, inwardly directed bottom part. Further, these containers are conveniently and readily prepared.

Further advantages of the present invention will appear hereinbelow.

BRIEF DESCRIPTION OF THE DRAWINGS

The foregoing will be more readily apparent when considered in connection with the following illustrative drawings wherein:

FIG. 1 is a side-sectional view of a preform for preparing a container of the present invention;

FIG. 1A is a sectional view taken along lines 1A—1A of FIG. 1;

FIG. 2A is a partial perspective view of a core for forming the preform of FIG. 1;

FIG. 2B is a sectional view of a core-injection mold assembly for forming the preform of FIG. 1;

DETAILED DESCRIPTION OF PREFERRED EMBODIMENTS

Figure 4:
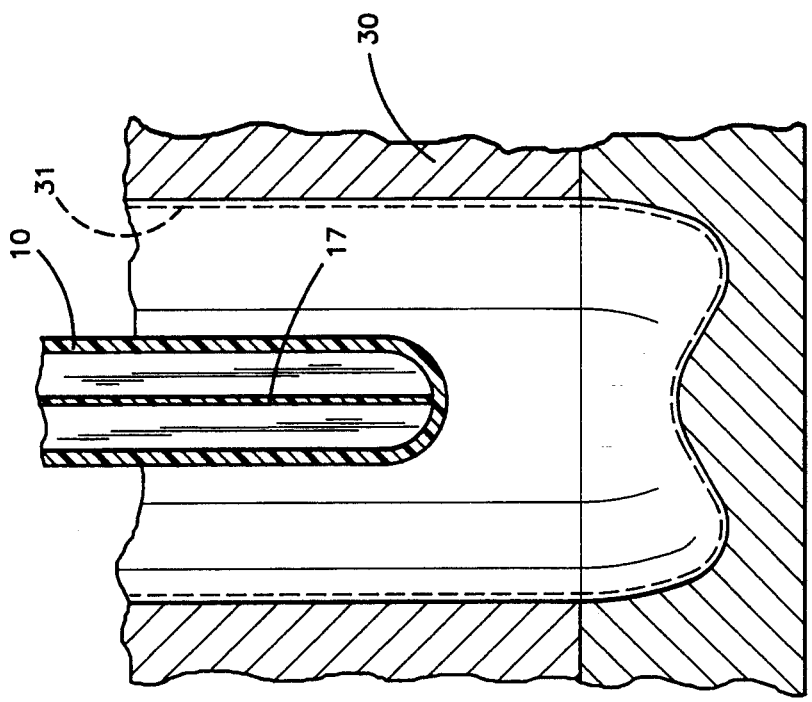
FIG. 4 is a partial sectional view taken through a blow mold for forming a container of the present invention from a preform similar to the preform of FIG. 1.

In accordance with the present invention, the external configuration of the container of the present invention may be made to exhibit depressions and lobes between the depressions which may serve to facilitate gripping the bottle. This is particularly desirable for a bottle or container with a large circumference and makes the container easy to handle when full or partially full. Internal supporting members are provided adjacent the depressions to support same against internal pressure to provide a firm handgrip portion.

In addition, a further feature of the present invention is to provide a base or bottom portion with an axially, inwardly directed part, as a generally conical part, and at least one supporting member inside the container supporting the bottom part against deformation due to internal pressure. This is particularly useful since it is highly desirable to strengthen such an inwardly directed part or champagne base type structure.

Further, the internal supporting wall or walls of the present invention are particularly desirable in blow molded plastic containers in order to provide a supported wall structure.

The preform for forming these containers may be prepared by injection molding or extrusion molding techniques and includes an internal wall extending completely across the inside of the preform which will correspond generally to the internal supporting member in the final blow molded container.

Referring to FIG. 1, a plastic parison or preform 10 is formed by injection molding or extrusion molding from a synthetic resin which desirably can be biaxially oriented as for example polyethylene terephthalate. The preform 10 has a neck portion 11 defining an opening 12 and it may be provided with external threads 13 to serve as the site for attachment of a cap or closure means on the finished, blow molded plastic container. The preform 10 has a body portion 14 depending from the neck portion 11 and an integral bottom portion 15 depending from the body portion. The body portion in FIG. 1 is generally tubular, although one can of course deviate from a tubular structure. Neck portion 11 has an inside wall face 11A and an outside wall face 11B, tubular body portion 14 has an inside wall face 14A and an outside wall face 14B, and bottom portion 15 has an inside wall face 15A and an outside wall face 15B. Body portion 14 defines hollow space 16 within preform 10, wherein the hollow space 16 is closed at the bottom portion 15 and open at neck opening 12. Bottom portion 15 may have any desired or convenient shape depending upon desired processing and final container characteristics, such as for example the rounded semi-circular shape shown in FIG. 1, or for example a flat or even slightly inwardly directed bottom shape.

Preform 10 includes at least one and preferably two internal walls 17, such as the two walls shown in FIG. 1A. The internal walls 17 extend completely across hollow space 16 and from the bottom portion 15, into tubular body portion 14 ending in body portion 14. As shown in FIG. 1A, four separate chambers 17A, 17B, 17C and 17D are formed by internal walls 17, although of course the chambers communicate with each other above wall 17. As can be clearly seen in FIG. 1A, the internal walls 17 are integral with inside wall face 14A. They are also integral with inside wall face 15A as can be seen from FIG. 1. Thus, the internal wall or walls provide an integral supporting structure for the preform walls. Also, the preform may be made of transparent PET so that the internal walls are readily visible.

A convenient method of forming preform 10 by injection molding is shown in FIGS. 2A and 2B. This represents a preferred method of forming preform 10; however, it should be understood that preform 10 may be formed by extrusion molding, if desired, using conventional extrusion molding techniques with an extrusion head including an opening cross member to form the desired internal walls, followed by pinching off the bottom portion to form the bottom portion.

Referring to FIG. 2A, injection molding core 20 is provided having external wall 21 in a generally cylindrical shape corresponding to the desired internal shape of preform 10. In addition, injection core 20 includes communicating hollow cross channels or slots 22 corresponding to the desired internal partition walls in the preform. Thus, core 20 is placed in injection mold 23 in the conventional manner with injection head 24 seated in injection mold 23 adjacent the bottom 25 of injection core 20. Core 20 is seated in injection mold 23 so that a space 26 appears between core 20 and injection mold 23 and molten plastic 27 is injected into space 26 via injection head 24. Molten plastic 27 will also travel into slots 22 in the core 20 to form the internal walls 17. The injection mold and core assembly is then opened, and the injection core with preform 10 thereon removed via platen 29. The injection core 20 is then removed from preform 10 as by holding the preform fixed while the core is moved in an axial direction.

The warm preform 10 is then placed in a blow mold 30 as shown in FIG. 4 and the container of the present invention formed therefrom as will be described hereinbelow.

The thus formed preform is brought to a temperature at which blow molding can be accomplished which may be done by heating a previously formed preform or forming the hot preform in line with the injection molding operation and suitably adjusting the temperature thereof, if necessary. Heating the internal walls, if necessary, may be done by circulating warm air inside the hollow space 16 or by inserting heaters inside at least one of the compartments formed by walls 17.

Figure 3:
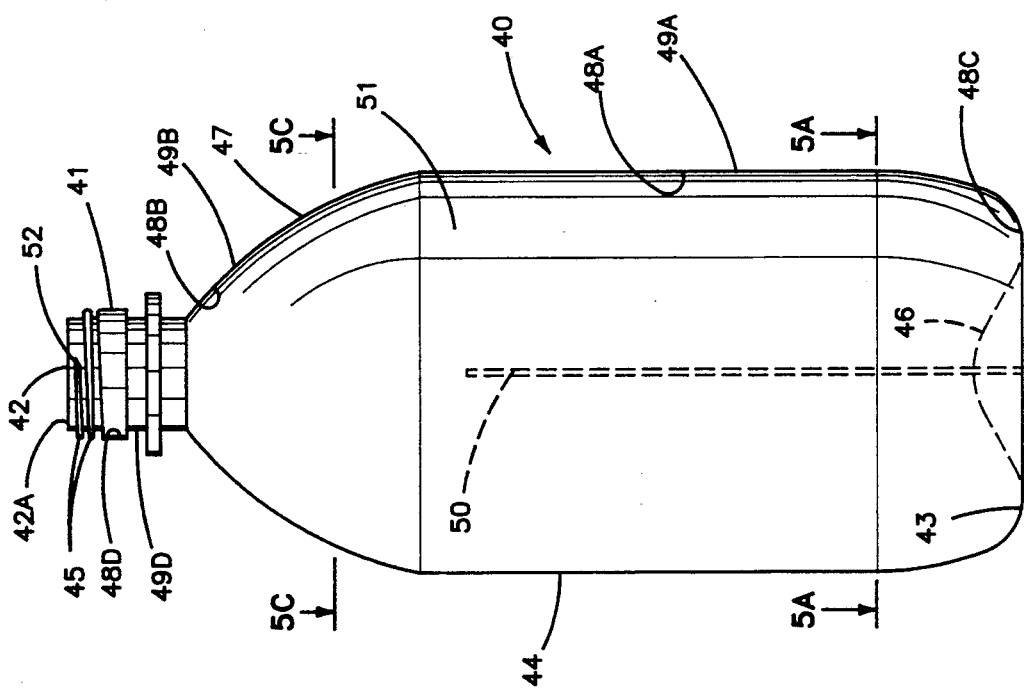
FIG. 3 is an elevational view of a container of the present invention.

The warm preform is placed in a blow mold having the configuration of the desired container, as blow mold 30 in FIG. 4, while blowing compressed air thereinto so that the preform expands into shape 31 shown in dashed lines in FIG. 4, to effect biaxial orientation and axial elongation. This procedure may be carried out with or without a stretch rod or mandrel to effect axial extension. If such a rod is used, it should have as many prongs as there are compartments, with each bearing against the preform bottom within each compartment. The walls 17 will also expand to the extent permitted by blow mold 30. The particular blow mold shown in FIG. 4 has an internal configuration which allows the formation of a plastic container 40 shown in FIG. 3, although naturally other configurations may be selected. Naturally, if the desired final configuration includes at least two adjoining lobes connected together by depressions, the blow mold will have this configuration. Similarly, if an axially, inwardly directed bottom part is desired (as shown in FIGS. 3 and 4) the blow mold will have this configuration. The preform will expand into the shape permitted by the blow mold, and the internal walls will also expand correspondingly.

Thus, blow molded, plastic container 40 is formed having a neck portion 41 defining an opening 42, a bottom portion 43, a body portion 44 as a generally tubular body portion interconnecting the neck portion 41 and the bottom portion 43. Neck portion 41 is provided with external threads 45 corresponding to threads 13 on preform 10 to serve as the site for attachment of a closure on the container. Bottom portion 43 has an axially, inwardly directed generally conical base 46. Container 40 also includes shoulder portion 47 connecting neck portion 41 and tubular body portion 44, and also has body portion inside wall face 48A and outside wall face 49A, shoulder portion inside wall face 48B and outside wall face 49B, bottom portion inside wall face 48C and outside wall face 49C and neck portion inside wall face 48D and outside wall face 49D.

Container 40 is provided with at least one internal wall 50 which corresponds to the internal wall 17 of preform 10 and which extends completely across hollow space 51 within container 40 and from the bottom portion 43 to the body portion 44, ending in the body portion, to form at least two separate chambers, see chambers 51A, 51B, 51C and 51D in FIG. 5 communicating with each other in the body portion at the termination of internal wall 50.

As can be readily seen from FIGS. 3 and 5, the internal walls are integral with the container, see FIG. 5 which clearly shows internal wall 50 integral with inside wall face 48 and providing a firm support for the container walls. Naturally also the supporting wall or walls are integral with the bottom portion inside wall face 48C and provide a firm support therefor.

Referring to FIG. 5, outside wall face 49 defines adjoining arcuate lobes 60 connected together by depressed regions or depressions 61, particularly suitable for a handgrip in a large sized container. Naturally, alternate shapes can be provided. Supporting members 50 in hollow space 51 are situated adjacent the depressions and provide support therefor. The supported handgrips thus provided will not evert as the bottle is pressurized.

Figures 5A, 5B:
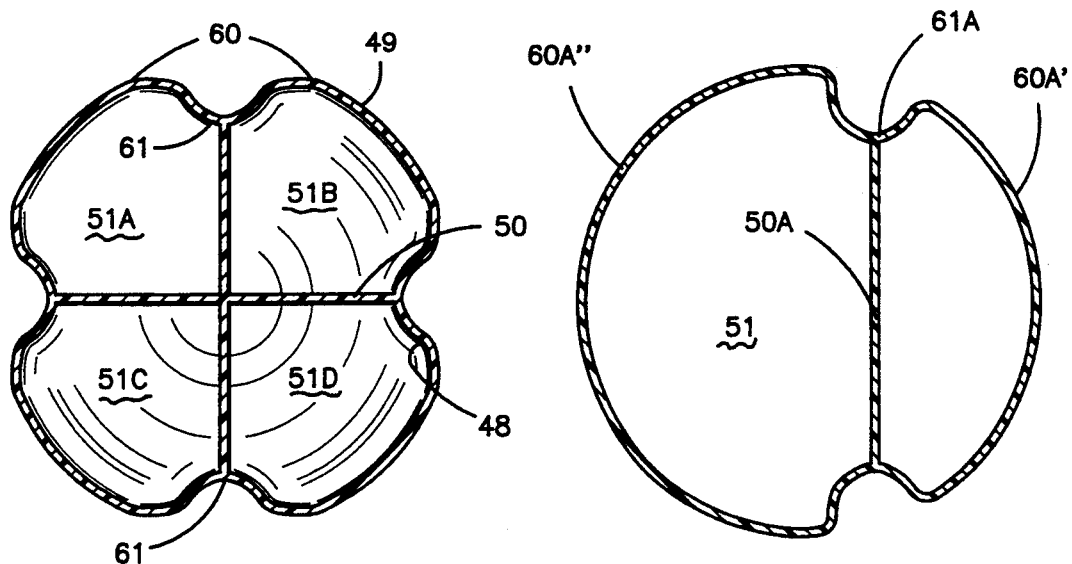
FIG. 5A is a cross-sectional view taken along lines 5A—5A of FIG. 3.
FIG. 5B is a variation of the embodiment of FIG. 5A.

The embodiment of FIG. 5B shows a single supporting wall 50A with lobe 60' being smaller than lobe 60A", said lobes being joined together by depressions 61A, and with the supporting wall crossing hollow space 51 spaced from the center thereof. This construction provides a relatively small, easy to handle lobe.

In contrast, the embodiment of FIG. 5A shows lobes 60 of approximately equal size and with supporting wall 50 crossing the center of hollow space 51. As can be appreciated, one can use a single supporting wall as shown in FIG. 5B, or two supporting walls as shown in FIG. 5A, or more than two supporting walls if desired. Advantageously, the supporting walls are integral with the inside wall faces of the bottom portion and at least a part of the body portion depending on the upward extent of the supporting wall. They are adjacent the depressions and provide a firm support for same which will for example prevent eversion of the walls. Therefore, the handgrip will remain firm and stable whether the container is full or partly full. As can be seen from FIGS. 3 and 5C, the internal wall desirably ends within the body portion. Similarly, the lobes and depressions which for the handgrip may end in the body portion and indeed may, if desired start and end in the body portion to a discrete handgrip. This is shown in a representative embodiment of FIG. 6 wherein container 40A has discrete handgrips formed by depressions 61B and lobes 60B. Supporting member 50B is provided adjacent and supporting the depressions as in the other embodiments. Of course, if desired, the handgrip may extend all the way to the bottom portion or may extend well into the shoulder portion. This provides considerable versatility to the container of the present invention.

Figure 6:
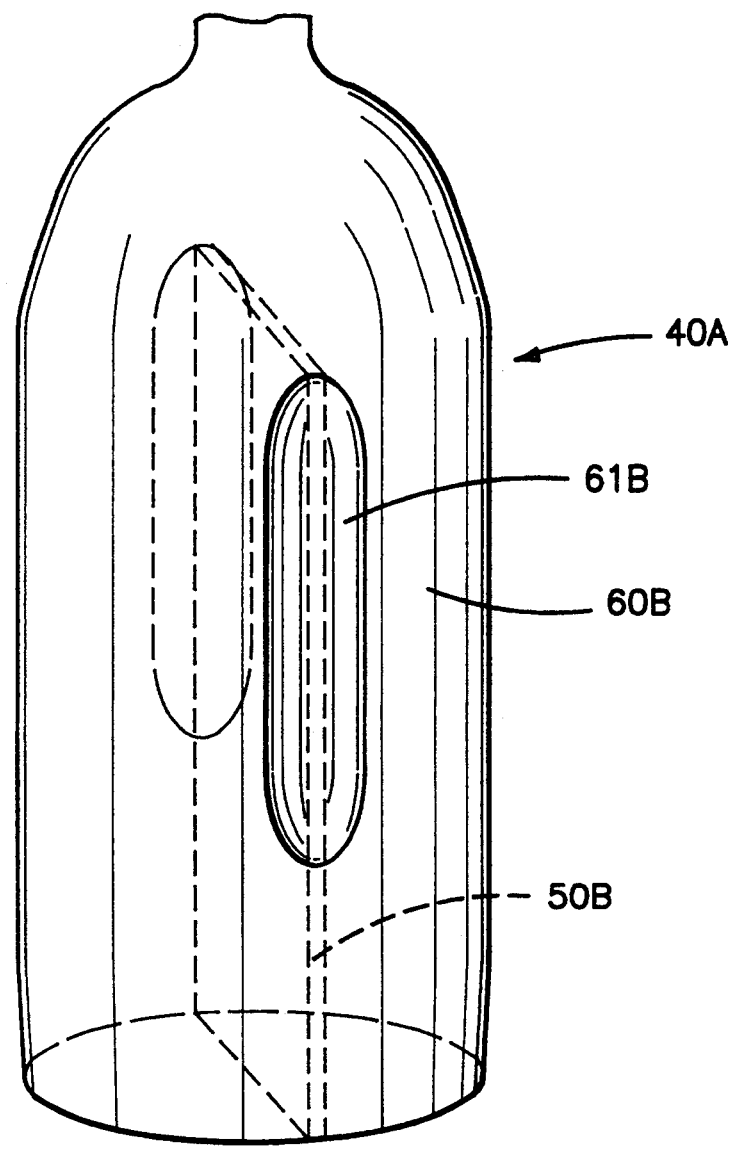
FIG. 6 is an alternate embodiment similar to FIG. 3.

If desired, the lobes and depressions can simply form undulations or other decorative patterns in the outside wall face for the purpose of distinguishing the container, in a manner after FIGS. 5A and 6. Accordingly, in accordance with the present invention, there may readily be a plurality of narrow lobes for decorative purposes.

Figure 7:
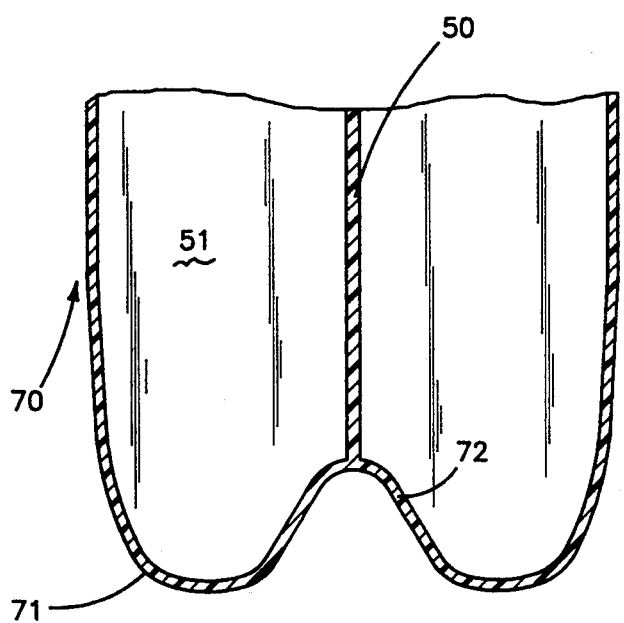
FIG. 7 is a side-sectional view of the bottom portion of a container of the present invention including an axially, inwardly directed bottom portion with a support member therefor.

FIG. 7 shows container 70 with a modified champagne base 71 including an axially, inwardly directed generally conical part 72. Supporting member 50 in hollow space 51 is situated adjacent conical part 72 and supports the conical part, which may be in addition to serving as a supporting member as in the other embodiments. As shown in FIG. 7, supporting member 50 is integral with and connected to conical part 72, extending to the body portion of the container as in FIG. 3.

Figures 8, 10:
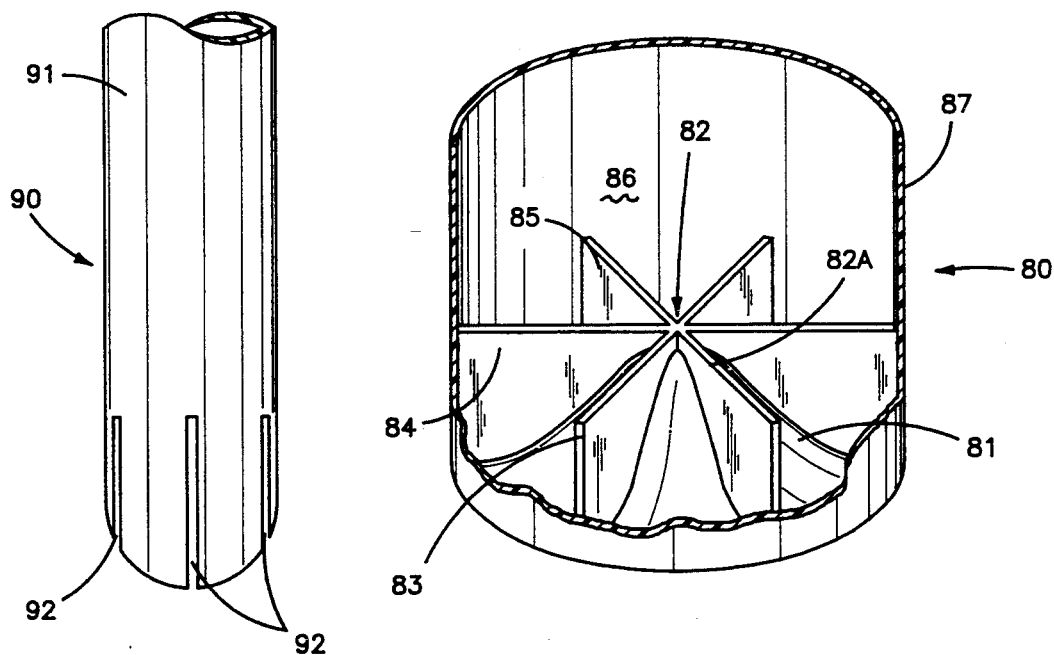
FIG. 8 is a perspective view of an embodiment of a supported bottom portion of a container of the present invention.
FIG. 10 is a partial perspective view of a preform core for forming a preform suitable to prepare the container structure shown in FIG. 8.

The embodiment of FIG. 8 shows container 80 with a modified champagne base 81 including an axially, inwardly directed conical part 82. A plurality of internal walls or supporting members 83, 84 and 85 are situated in hollow space 86 supporting conical member 82 and side walls 87 as well as base 81. As can be clearly seen in FIGS. 8 and 9, the supporting members are integral with a part of the body portion inside wall face 87A and with the inwardly directed part inside wall face 82A to provide a firm and rigid support for the inwardly directed part and the adjacent and integral walls. The supporting walls may terminate in the body portion as with other embodiments. The exact number of supporting walls will depend on the particular container.

Figures 5C, 9:
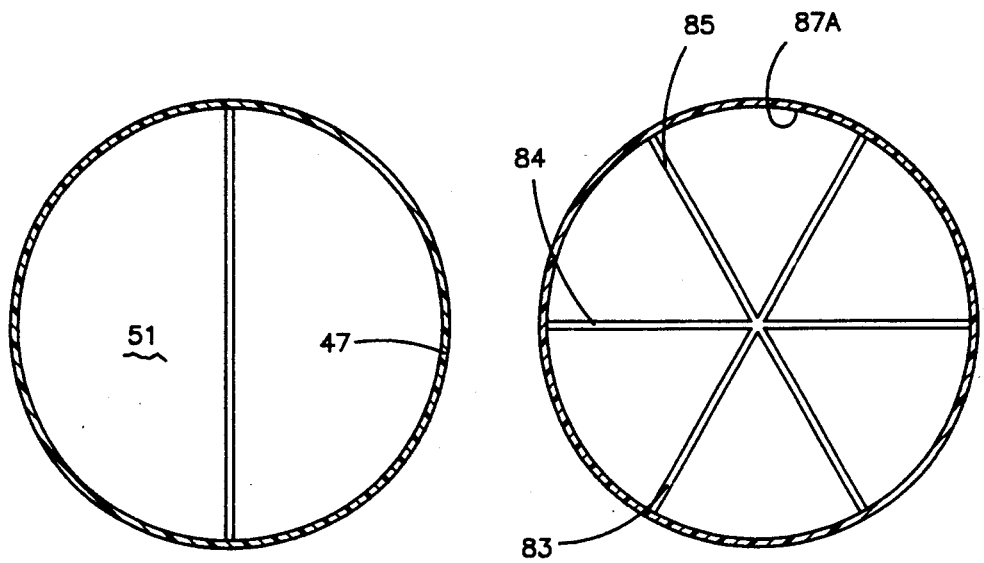
FIG. 5C is a cross-sectional view taken along lines 5C—5C of FIG. 3.
FIG. 9 is a sectional view of the bottom portion of FIG. 8.

FIG. 10 shows a partial perspective view of a suitable core 90 for forming a preform suitable to make the container of FIGS. 8 and 9. Core 90 has an external wall 91 in a generally cylindrical shape similar to the core in FIG. 2A. Communicating hollow cross channels or slots 92 correspond to the number and height of supporting walls desired in the final container. In a manner after FIGS. 2A and 2B, molten plastic will travel into slots 92 to form the internal walls.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A blow molded plastic container comprising:
 a neck portion defining an opening, a bottom portion and a body portion interconnecting said neck and bottom portions;
 wherein said neck, body and bottom portions define a hollow space closed at the bottom portion and open at the neck portion;
 said neck, body and bottom portions having an inside wall face and an outside wall face;
 at least one supporting member in the hollow space extending completely across the hollow space and integral with the inside wall face of the body portion at two spaced locations thereof to support said inside wall face, wherein said supporting member terminates in the body portion; and
 wherein the body portion outside wall face defines regions that define at least two molded depressions dividing said body portion into at least two adjoining molded lobes, with the depressions and lobes being limited in extent to the body portion, said depressions being interconnected and supported by said supporting member to prevent outward bulging of the depressions as supported by the supporting member, wherein said depressions and lobes form a handgrip, and wherein said handgrip is limited in extent to the body portion.

2. A container according to claim 1 wherein the supporting member extends from the bottom portion to the body portion and is integral with both the bottom and body portions.

3. A container according to claim 2 wherein the bottom portion includes an axially, inwardly directed part having an inside wall face, and wherein said supporting member is integral with at least part of the body portion inside wall face and is also integral with the inwardly directed part inside wall face, to support said integral inside wall faces.

4. A container according to claim 3 including a plurality of said supporting members.

5. A container according to claim 1 including four of said adjoining lobes, and four of said depressions, and two of said supporting members comprising internal supporting walls extending completely across said hollow space, with each supporting wall interconnecting two of said depressions.

6. A container according to claim 1 wherein said lobes are of approximately the same size and wherein said supporting member approximately crosses the center of said hollow space.

7. A container according to claim 1 wherein said lobes are of unequal size and wherein said supporting member crosses the hollow space spaced from the center thereof.

8. A container according to claim 1 wherein said lobes are connected together by said depressions in a gradually curved configuration.

9. A container according to claim 1 wherein said container is expanded from a preform in a blow mold and said supporting member is expanded to the extent permitted by the blow mold.

* * * * *